Oct. 29, 1935.  E. O. STOUT  2,018,747

REFRIGERATING APPARATUS

Original Filed Nov. 19, 1931  7 Sheets-Sheet 1

INVENTOR
Elmer O. Stout.
BY
Spencer, Hardman, and Fehr.
HIS ATTORNEYS.

Oct. 29, 1935.  E. O. STOUT  2,018,747
REFRIGERATING APPARATUS
Original Filed Nov. 19, 1931  7 Sheets-Sheet 2

INVENTOR
Elmer O. Stout.
BY
Spencer, Hardman, and Fehr.
HIS ATTORNEYS.

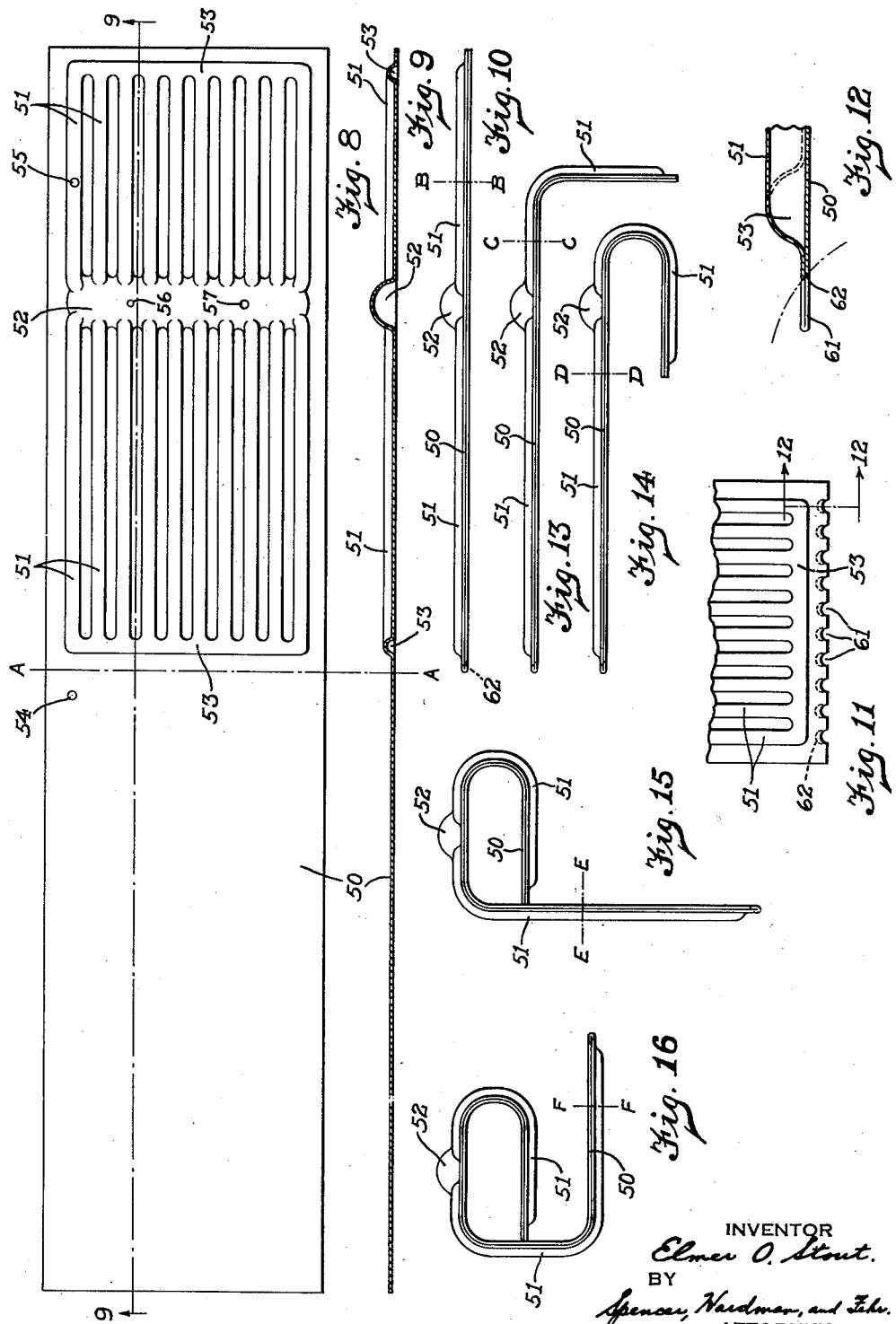

Oct. 29, 1935.  E. O. STOUT  2,018,747
REFRIGERATING APPARATUS
Original Filed Nov. 19, 1931   7 Sheets-Sheet 5

INVENTOR
Elmer O. Stout.
BY
Spencer, Hardman, and Fehr.
HIS ATTORNEYS.

Oct. 29, 1935.  E. O. STOUT  2,018,747
REFRIGERATING APPARATUS
Original Filed Nov. 19, 1931   7 Sheets-Sheet 6
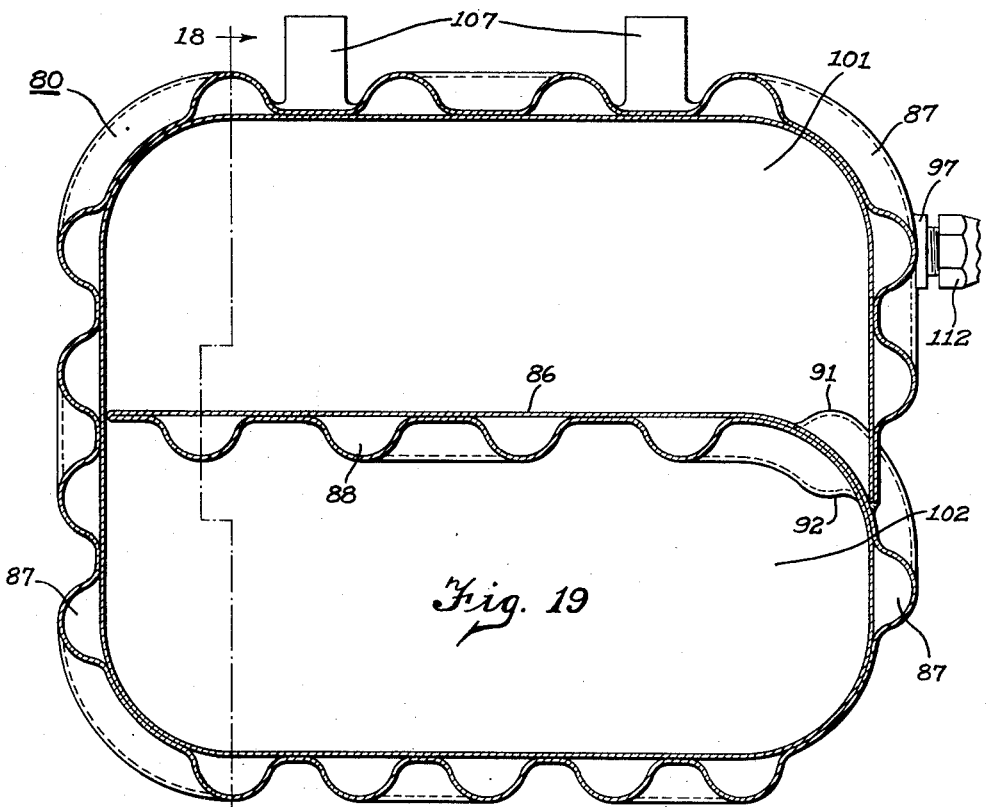
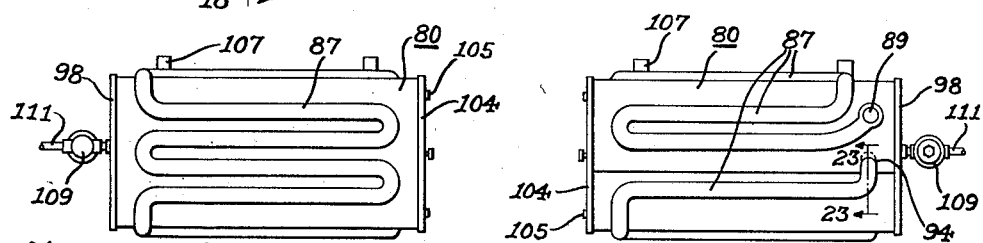
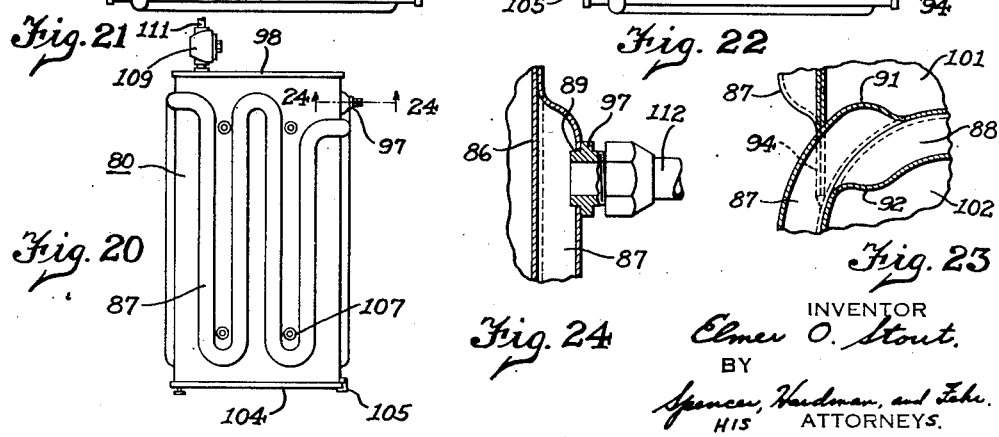
INVENTOR
Elmer O. Stout.
BY
Spencer, Hardman, and Fahr.
HIS  ATTORNEYS.

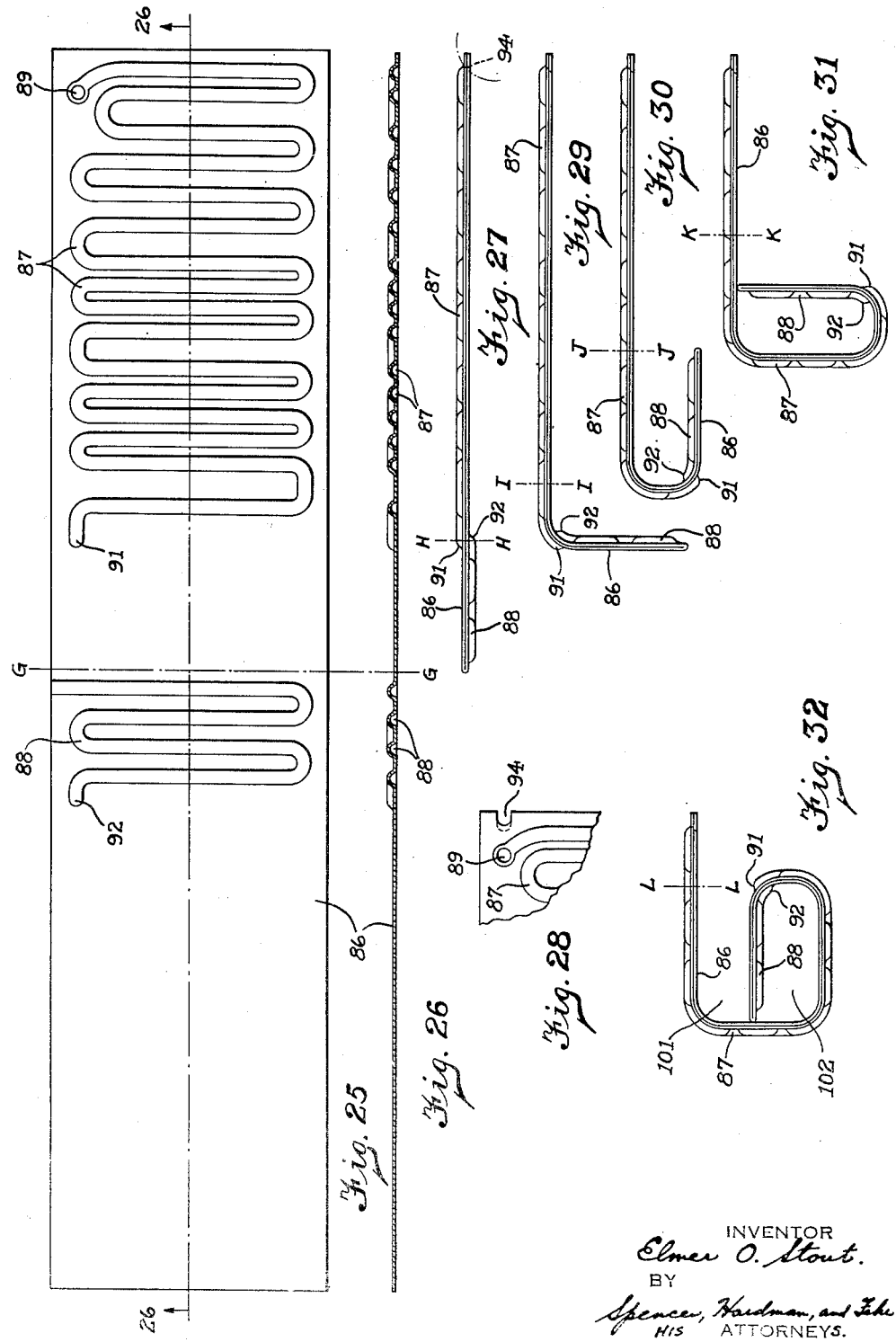

Patented Oct. 29, 1935

2,018,747

UNITED STATES PATENT OFFICE 2,018,747

REFRIGERATING APPARATUS

Elmer O. Stout, Dayton, Ohio, assignor, by mesne assignments, to General Motors Corporation, a corporation of Delaware Application November 19, 1931, Serial No. 576,033
Renewed May 6, 1933

20 Claims. (Cl. 62—126)

This invention relates to evaporators for refrigerating systems and particularly to evaporators of the sheet metal type and to the method of forming same.

An object of the invention is to provide an evaporator with a plurality of sharp freezing compartments disposed in different horizontal planes and to form the walls of each of said compartments from double walled sheet metal having refrigerant conveying duct means therebetween.

In carrying out the foregoing object, it is a still further object of the invention to form both walls of the double walled sheet, which sheet is adapted to be bent or folded into the desired form of evaporator, from a single sheet of metal.

Further objects and advantages of the present invention will be apparent from the following description reference being had to the accompanying drawings, wherein a preferred form of the present invention is clearly shown.

In the drawings:

Fig. 8 is a plan view of a plate employed in the construction of the evaporator disclosed in Fig. 2;

Fig. 9 is a sectional view of the plate shown in Fig. 8 and taken on the line 9—9 thereof;

Fig. 10 shows the plate disclosed in Fig. 8 folded or bent upon itself to form a double walled sheet with refrigerant conveying ducts therebetween before being bent into the desired shape;

Fig. 11 is a plan view of one end of the double walled sheet showing a plurality of notches cut therein;

Fig. 12 is a sectional view taken on the line 12—12 of Fig. 11 showing the curve of the end of one of the plurality of notches;

Fig. 13 shows the double walled sheet after the first bending operation has been performed;

Fig. 14 shows the double walled sheet after the second bending operation has been performed;

Fig. 15 shows the double walled sheet after the third bending operation has been performed;

Fig. 16 shows the double walled sheet after the fourth bending operation has been performed;

Fig. 19 is a sectional view of the modified form of evaporator taken on the line 19—19 of Fig. 18;

Fig. 20 is a top plan view of the evaporator shown in Fig. 17;

Fig. 21 is a plan view of one side of the evaporator shown in Fig. 17;

Fig. 22 is a plan view of another side of the evaporator shown in Fig. 17;

Fig. 23 is a fragmentary section taken on the line 23—23 of Fig. 22 showing a refrigerator duct extending from a vertical wall to a horizontal wall of the evaporator;

Fig. 24 is a fragmentary sectional view taken on the line 24—24 of Fig. 20 showing an outlet pipe connected to the evaporator;

Fig. 25 is a plan view of a plate employed in the construction of the modified form of evaporator;

Fig. 26 is a sectional view of the plate shown in Fig. 25 and taken on the line 26—26 thereof;

Fig. 27 shows the plate disclosed in Fig. 25 folded upon itself to form a double walled sheet with refrigerant conveying duct means therebetween before being bent into the desired shape;

Fig. 28 is a fragmentary plan view of one end of the double walled sheet showing a notch cut therein;

Fig. 29 shows the double walled sheet after the first bending operation has been performed;

Fig. 30 shows the double walled sheet after the second bending operation has been performed;

Fig. 31 shows the double walled sheet after the third bending operation has been performed, and Fig. 32 shows the double walled sheet after the fourth bending operation has been performed.

My invention contemplates the construction of an evaporator from a single sheet of metal folded upon itself and formed to provide a double walled sheet having refrigerant conveying duct means therebetween or from two plates having portions thereof spaced apart to provide refrigerant conveying duct means therebetween. I form the double wall sheet to provide both spaced apart vertical walls and the horizontal walls of a freezing chamber and further form the sheet to provide a plurality of walls of another freezing chamber disposed in a different horizontal plane than the first mentioned chamber. The sheet comprising each double wall around a compartment has refrigerant conveying duct means formed therein and therefore not only provides a freezing compartment closed on at least four sides but also provides means within at least four walls of the freezing compartments for directly and rapidly absorbing heat from the walls or from the substances placed therein to be frozen.

Figure 1:
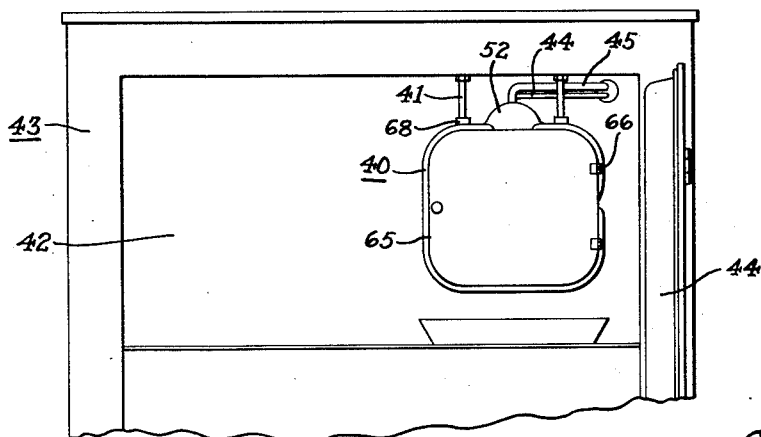
Fig. 1 is a front view of my improved evaporator installed in a refrigerator of the household type.
Figure 3:
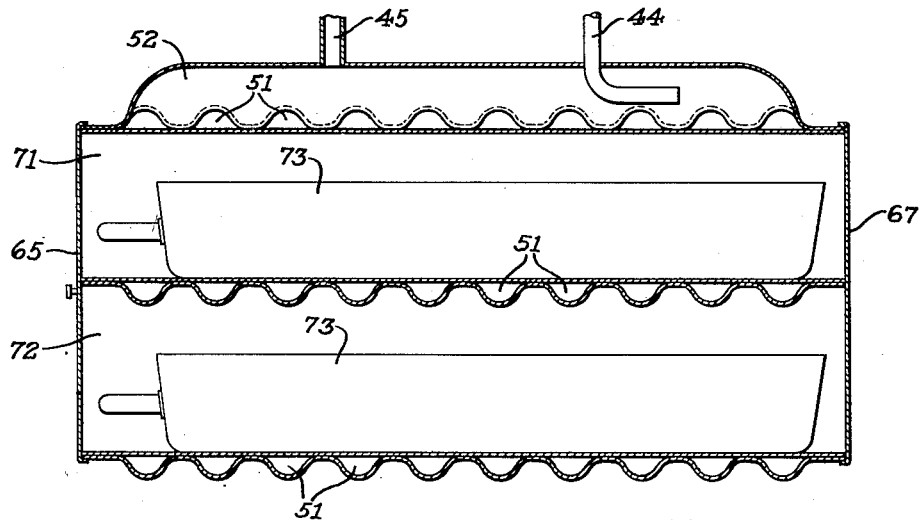
Fig. 3 is a sectional view through the evaporator taken on the line 3—3 of Fig. 2.

Referring now to the drawings and particularly to Fig. 1 thereof, I have shown an evaporator or cooling unit 40 mounted, in any suitable manner such as by rods 41, in the upper portion of the compartment 42 of a household refrigerator cabinet 43. The door 44 which provides access to the food storage compartment 42 of the cabinet 43 being shown in open position. The evaporator or cooling unit 40 is connected with a refrigerant compressing condensing and liquefying unit of any suitable type (not shown) and in the form illustrated, it is connected by the liquid refrigerant inlet and the gaseous refrigerant outlet pipes 44 and 45 respectively (see Fig. 3).

Figure 6:
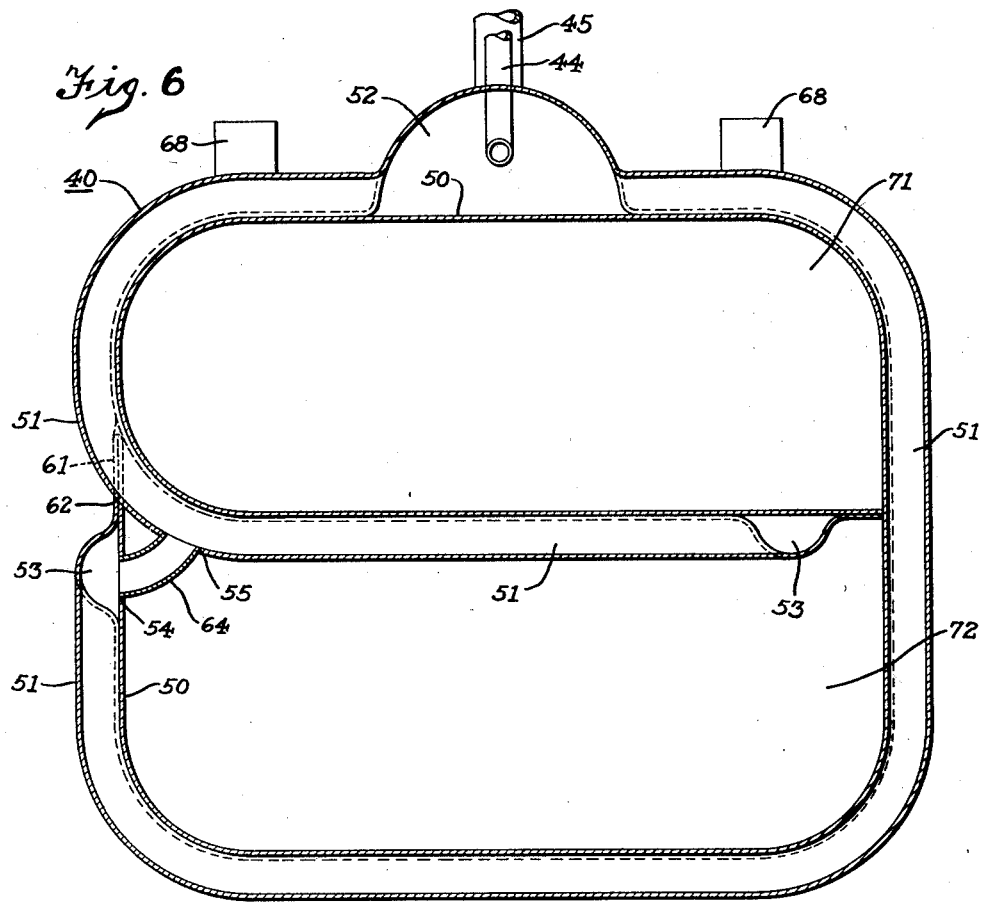
Fig. 6 is a sectional view of my improved evaporator taken on the line 6—6 of Fig. 4.

I will first describe the method of making the evaporator 40 disclosed in Fig. 1. A plate or single sheet of metal 50 has two sets of a plurality of elongated depressions 51 formed in one-half of the sheet and depressed from the force of the sheet opposite the face shown in Fig. 8 of the drawings (see Fig. 9). Each set of elongated depressions 51 have one of their ends terminating in a depression 52 which is of greater depth than the depressions 51 (see Fig. 9). The ends of the elongated depressions 51 disposed on the two sides of the depression 52 terminate in depressed manifolds 53. A hole or opening 54 is punched or cut in the left side of the plate 50 as viewed in Fig. 8. Another hole or opening 55 of the same diameter as hole 54 is also punched or cut in the depression 51 as viewed in Fig. 8. Two holes or openings 56 and 57 are also cut or punched in the depressed portion 52 of the plate 50. After the depressions and openings are provided in the plate 50, the plate 50 is folded upon itself at the point designated by the line A—A in Figs. 8 and 9, which line extends across the center of the plate 50. The non-depressed or plain end of the plate 50 is folded over into contact with the flat portion of the depressed end of the plate as shown in Fig. 10. The contacting portions of two layers of the plate or the single sheet of metal 50 are then spot or roll welded together. Holes or openings 54 and 55 provided in plate 50 are arranged so as to be in vertical alignment after the sheet metal structure has been formed into the desired shape. That is, the hole 54 is directly opposite and slightly below hole 55 as disclosed in Fig. 6 of the drawings. Holes 56 and 57 are of course at the top of the structure as shown in Fig. 6 and have the refrigerant pipes 44 and 45 passing therethrough. After being secured together, the ends of both thicknesses of the metal of the sheet shown in Fig. 10 have a plurality of notches 61 cut therein. The inner ends of the notches 61 are cut in the shape of a curve as at 62 (see Figs. 10, 11 and 12). The purpose of the curved end 62 of the notches 61 will be hereinafter pointed out.

Figure 7:
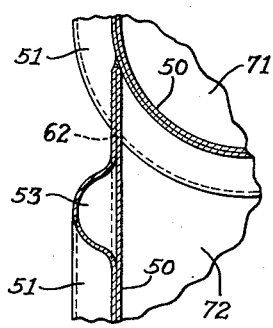
Fig. 7 is a fragmentary sectional view of a portion of my improved evaporator taken on the line 7—7 of Fig. 4.

The structure shown in Fig. 10, after being secured together and after having the notches 61 cut therein, is bent or folded along the line designated at B—B in Fig. 10 to provide the horizontal portion and a vertical portion of a structure as disclosed in Fig. 13. The structure disclosed in Fig. 13 is then bent along the line designated at C—C in Fig. 13 to provide the structure shown in Fig. 14. It will be noted that the bottom, top and one vertical side wall of an enclosure is now provided by the operations thus far performed to the sheet. The structure disclosed in Fig. 14 is bent along the line designated at D—D to provide both vertical side walls and the top and bottom walls of an enclosure as shown in Fig. 15. The portion of the structure extending beyond the enclosure thus formed is then bent along the line designated at E—E in Fig. 15 to provide a vertical side wall and a bottom wall of a second enclosure as shown in Fig. 16. The structure is then again bent along the line designated at F—F in Fig. 16 to provide all the walls of a plurality of superimposed compartments of an evaporator. Thus, an evaporator having the same outline as the evaporator shown in Fig. 2 of the drawings is formed. After the last mentioned bending operation, it is obvious that the notches 61 at the end of the sheet snugly fit over the raised portion formed by the depressions 51 as disclosed in Fig. 6, thus permitting the end of the sheet to contact with a portion of the structure as shown in Fig. 7. These end contacting portions of the sheet may then be secured, if desired, to the structure in any suitable manner, such as by welding.

Further assembly of the evaporator 40 comprises the placing of the ends of a short piece of pipe 64 in the vertically aligned holes 54 and 55 (see Fig. 6). The pipe 64 may be secured to the openings 54 and 55 in any suitable manner such as by welding the pipe 64 to the edges of the openings. A door 65 may then be placed on the front of the structure, if desired. In order to pivotally support the door 65, hinges 66 may be secured in any suitable manner to the sheet 50 after the structure has been formed into the desired shape. A back 67 may, if desired, also be placed on the formed structure in any suitable well-known manner. Studs 68 for receiving the mounting rods 41 may then be welded to the top wall of the structure.

Obviously the foregoing bending and assembling operations of the structure disclosed produces a double walled sheet metal evaporator having a plurality of sharp freezing compartments 71 and 72 disposed in different horizontal planes. The depressed portions of the sheet or the spaced apart portions of the double sheet metal wall provide refrigerant conveying duct means in at least four walls of each of the freezing compartments 71 and 72. The bottom wall of each superimposed freezing compartment, provided within the freezing chamber or zone formed by the double wall sheet, affords a plurality of vertically disposed refrigerated shelves or supports for the reception of ice trays or receptacles 73. The depression 52 in the sheet or plate 50 may, if desired, serve as a float valve chamber having a mechanism therein responsive to the level of liquid refrigerant for controlling the ingress of liquid refrigerant to the evaporator 40. However, the evaporator disclosed in the drawings is particularly designed for operation in connection with a refrigerating system employing a high side float, which float is well-known in the art and usually includes a float valve responsive to the amount of refrigerant liquefied by the refrigerant compressing condensing and liquefying unit of the system. Obviously, the level of liquid refrigerant in an evaporator of this type, when connected with a system as explained remains substantially at a predetermined height so as to completely fill or flood all the refrigerant ducts provided in the evaporator by the depressions 51, 52 and 53.

Figure 2:
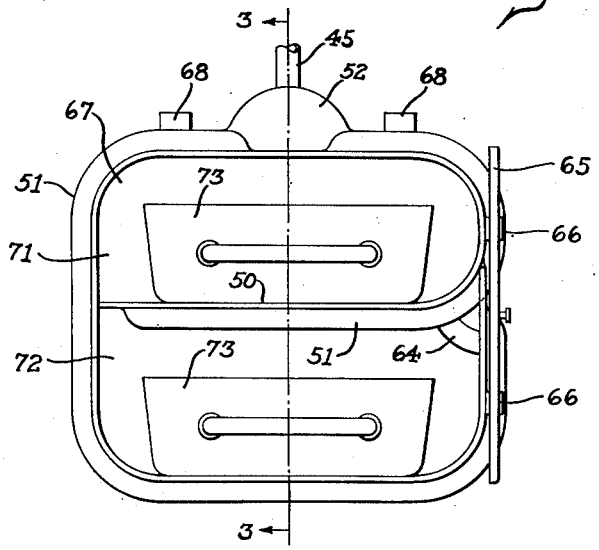
Fig. 2 is an enlarged front view of my improved evaporator with the door providing access to a plurality of sharp freezing compartments therein shown in open position.
Figure 4:
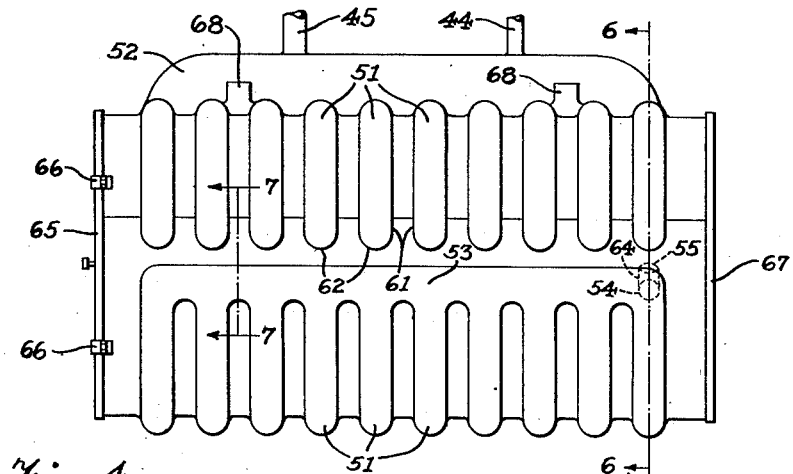
Fig. 4 is an elevational view of one side of my improved evaporator.
Figure 5:
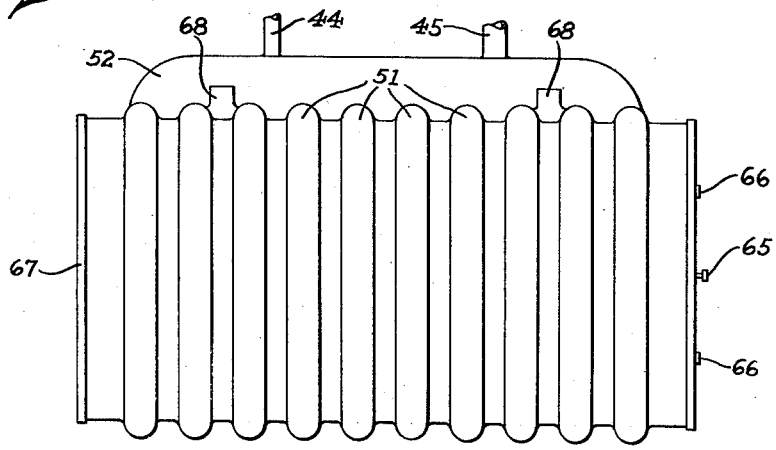
Fig. 5 is an elevational view of another side of my improved evaporator.

The manifold 53 which extends across the right side of the evaporator 40 as viewed in Figs. 2 and 4, will tend to trap gaseous refrigerant vaporized in the refrigerant ducts located in the bottom wall and right vertical wall of the lower compartment 72 unless some provision is provided for releasing this gaseous refrigerant as it vaporizes. Therefore, the pipe 64 connected to the manifold 53 by the hole 54 and by the hole 55 to one of the refrigerant ducts, formed by one of the depressions 51, serves to permit gaseous refrigerant, vaporized in the ducts of the bottom wall and right vertical wall of the compartment 72 to freely flow upward to the header formed by the depression 52 and thence to the gaseous refrigerant outlet pipe 45 leading from the evaporator 40.

Figure 17:
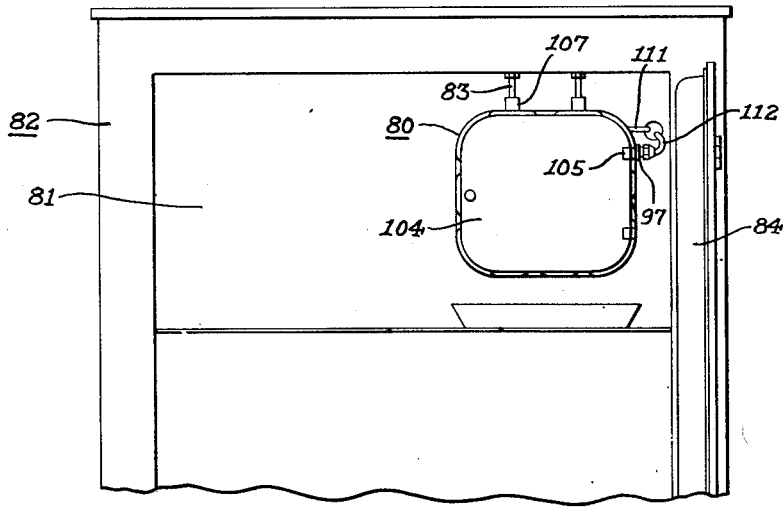
Fig. 17 is a front view of a modified form of my improved evaporator installed in a refrigerator cabinet of the household type.

In Fig. 17 I have disclosed a modified form of my improved evaporator. The modified evaporator 80 is supported in the upper part of a compartment 81 of a cabinet 82 by the rods 83. The door 84 which provides access to the food storage compartment 81 is shown in open position.

I will now proceed to describe the method of forming the modified form of my improved evaporator as shown in Fig. 17. A plate or single sheet of metal 86 (see Fig. 25) has a relatively long continuous serpentine depression 87 formed at one side of the line designated at G—G and depressed from the face of the plate opposite the face shown in Fig. 25 (see Fig. 26). A hole or opening 89 is then punched or cut at one end of the depression 87. A similar short continuous serpentine depression 88 is formed in the plate 86 at the opposite side of the line G—G and extends to the edge of the plate. The serpentine depression 88 is depressed from the same face of the plate as the serpentine depression 87 (see Fig. 26). After forming the depressions 87 and 88 and punching the hole 89 in the plate 86, the side of the plate having the depression 88 formed therein is folded along the line G—G onto the flat face of the plate having the depression 87 formed therein to provide the sheet or double wall structure as disclosed in Fig. 27. The depressions 87 and 88 are arranged so that the end 91 of depression 87 and the end 92 of depression 88 register with one another, after the single sheet 86 is folded upon itself, and thereby provides a continuous refrigerant conveying duct between the sheet thus folded. The layers of the double walled sheet as disclosed in Fig. 27 are then spot or roll welded together around the edges of the depressions 87 and 88 to provide a sealed refrigerant duct of serpentine form extending from one edge of the sheet metal structure to the hole or opening 89 in the opposite end thereof. The end of the metal sheet shown in Fig. 27 is then slotted as at 94 (see Figs. 27 and 28). Slot 94 serves for a purpose which will hereinafter be explained. The sheet metal structure shown in Fig. 27 is then bent or folded along the line H—H in Fig. 27 to provide a horizontal portion and a vertical portion as shown in Fig. 29. The structure is then again bent along the line I—I in Fig. 29 to provide a vertical wall and two horizontal walls of an enclosure as shown in Fig. 30. Again the structure is bent along the line J—J in Fig. 30 to provide four walls of an enclosure as shown in Fig. 31. The portion extending beyond the enclosure shown in Fig. 31 is bent along the line K—K to provide a vertical and horizontal wall of a second enclosure as disclosed in Fig. 32. The extending portion of the double sheet metal walled structure shown in Fig. 32 is then bent along the line L—L to provide a horizontal and two vertical walls of another enclosure or compartment of an evaporator or cooling unit having the same outline as the evaporator disclosed in Fig. 17. This last bending operation of the structure causes the inner end of slot 94 cut in the end of the sheet to register with the raised portion formed by the depression 87 along a vertical wall of the evaporator 80 (see Figs. 19 and 23). The edge of slot 94 and the end of the sheet metal structure are then welded to another portion of the structure at the point where the portion of the double metal wall extends horizontally into the chamber formed by the structure (see Fig. 19).

I have shown and described the double walled structure disclosed in Fig. 10 of the drawings as being bent in a particular manner to provide the evaporator shown in Figs. 1 and 2. It is obvious, however, that the structure disclosed in Fig. 10 may be bent in accordance with the disclosure of the method of bending the structure shown in Fig. 27 of the drawings. That is, the structure shown in Fig. 10 may be formed or rolled continuously in one direction by beginning the bending thereof adjacent one end of the structure in accordance with the description of the method of forming the structure disclosed in Fig. 27. Rolling or bending a double walled sheet metal structure continuously in one direction only to provide a plurality of walls of a plurality of separate sharp freezing compartments of an evaporator is highly desirable since such operation eliminates the necessity of reversely bending the structure to form corners of the compartments. By eliminating reverse bending or rolls the material of the structure is prevented from buckling, particularly at corners of the compartments, thus preventing the refrigerant passage between the double walled structure at these points from being restricted or entirely blocked.

Figure 18:
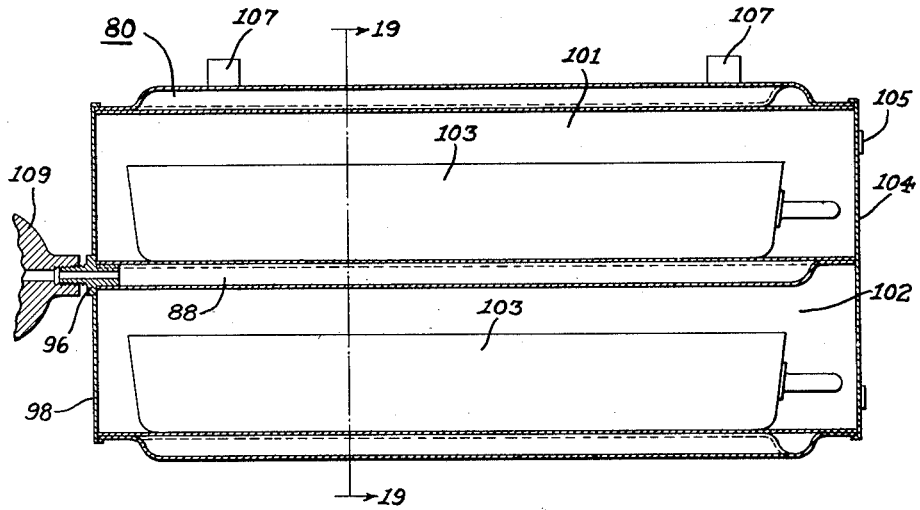
Fig. 18 is an enlarged sectional view of the modified form of my evaporator taken on the line 18—18 of Fig. 19.

After the foregoing bending operations have been performed to the sheet metal structure, a connector 96 is secured in any suitable manner to the open end of the depression 88 at the rear edge of the structure (see Fig. 18). A connector 97 is inserted and welded to the opening 89 provided in the end of the depression 87 (see Fig. 24). A back plate or cover 98 may then, if desired, be secured in any suitable manner to the structure. It is obvious that the bending operations of the metal double walled sheet provides two superimposed sharp freezing compartments 101 and 102 having refrigerated shelves for supporting receptacles such as ice trays 103 or the like. The outer walls forming the evaporator 80 thus define a freezing chamber and the end of the double walled structure which extends horizontally within the freezing chamber from one vertical wall thereof divides the chamber into two vertically disposed sharp freezing compartments having refrigerant conveying duct means in at least four walls thereof. A door 104 for closing and providing access to the compartments 101 and 102 is then pivotally mounted by the hinges 105 on the evaporator 80. Studs 107 adapted to receive the mounting rods 83 are welded to the top of the evaporator 80. The connector 96 conducts refrigerant, to the refrigerant conveying duct means formed by the depressions 87 and 88, from an expansion valve 109 of any suitable construction, which expansion valve is connected to the liquid refrigerant pipe 111 of the refrigerating system. The expansion valve 109 may be controlled in any desirable manner such, for example, by being responsive to the pressure within the refrigerant expansion duct of the evaporator or by a thermostat responsive to the temperature of the evaporator as is well-known in the art. Gaseous refrigerant, vaporized in the continuous refrigerant conveying duct of the evaporator, is directed to the the gaseous refrigerant return line 112 of the refrigerating system by connector 97. Since the refrigerant conveying ducts in the wall of my modified form of evaporator are connected in series, refrigerant first flows from the expansion valve 109 through the bottom wall or tray supporting surface of the freezing compartment 101 thence across a part of the vertical side wall of compartment 102 to the bottom wall or tray supporting surface of compartment 102. The refrigerant then flows in a serpentine path across the opposite side wall of compartment 102 and also across one side of compartment 101 to the top wall of the compartment 101. From the top wall of compartment 101 the refrigerant flows across the opposite side wall of compartment 102 and thence upwardly to the refrigerant outlet connection 97. The bottom walls of compartments 101 and 102 first receive refrigerant from the expansion valve and since these walls support the ice trays 103, heat will be rapidly conducted from the trays, thus rendering the freezing compartments of the evaporator 80 more efficient for quickly freezing substances contained in the trays 103.

From the foregoing it is apparent that I have provided an improved evaporator and a novel method of forming the same, which evaporator has refrigerant conveying duct means provided in a double sheet metal wall fashioned to provide at least four walls of a plurality of freezing compartments disposed in different horizontal planes. The refrigerated walls of the compartments of the evaporator not only substantially entirely enclose the compartments on at least four sides and prevent the circulating air within the cabinet from entering the freezing compartments of the cooling unit, but also efficiently removes heat absorbed from food products stored in the cabinet and circulated along with the air, thus maintaining the food storage compartment of the cabinet at a predetermined low temperature. Furthermore, a cooling unit or evaporator constructed according to my invention can be plated with a metal of high polishability so as to be neat in appearance and easily cleaned. My improved evaporator is very efficient and occupies a minimum amount of space in a refrigerator cabinet, thus increasing the food storage capacity of the cabinet.

While the forms of embodiment of the invention as herein disclosed constitute a preferred form, it is to be understood that other forms might be adopted, all coming within the scope of the claims which follow.

What is claimed is as follows:

1. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant coveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical walls and a horizontal wall of a sharp freezing compartment, a portion of each of the walls of said sheet including a portion of said refrigerant duct continuing from a wall of said sharp freezing compartment and also being bent to provide a plurality of walls of a second sharp freezing compartment disposed in a different horizontal plane than said first named compartment.

2. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical side walls and a top wall of a sharp freezing compartment, a portion of each of the walls of said sheet including a portion of said refrigerant duct continuing from a wall of said sharp freezing compartment and also being bent to provide a plurality of walls of a second sharp freezing compartment disposed in a different horizontal plane than said first named compartment.

3. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical side walls and a bottom wall of a sharp freezing compartment, a portion of each of the walls of said sheet including a portion of said refrigerant duct continuing from a wall of said sharp freezing compartment and also being bent to provide a plurality of walls of a second sharp freezing compartment disposed in a different horizontal plane than said first named compartment.

4. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical side walls, a top wall and a bottom wall of a sharp freezing compartment, a portion of each of the walls of said sheet including a portion of said refrigerant duct continuing from a wall of said sharp freezing compartment and also being bent to provide a plurality of walls of a second sharp freezing compartment disposed in a different horizontal plane than said first named compartment.

5. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical walls and a horizontal wall of a sharp freezing compartment, a portion of each of the walls of said sheet including a portion of said refrigerant duct continuing from a wall of said sharp freezing compartment and also being bent to provide at least one vertical wall and a horizontal wall of a second sharp freezing compartment disposed in a different horizontal plane than said first named compartment.

6. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical side walls and a top wall of a sharp freezing compartment, a portion of each of the walls of said sheet including a portion of said refrigerant duct continuing from a wall of said sharp freezing compartment and also being bent to provide at least one vertical wall and a horizontal wall of a second sharp freezing compartment disposed in a different horizontal plane than said first named compartment.

7. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical side walls, and a bottom wall of a sharp freezing compartment, a portion of each of the walls of said sheet including a portion of said refrigerant duct continuing from a wall of said sharp freezing compartment and also being bent to provide at least one vertical wall and a horizontal wall of a second sharp freezing compartment disposed in a different horizontal plane than said first named compartment.

8. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical side walls, a top wall and a bottom wall of a sharp freezing compartment, a portion of each of the walls of said sheet including a portion of said refrigerant duct continuing from a wall of said sharp freezing compartment and also being bent to provide at least one vertical wall and a horizontal wall of a second sharp freezing compartment disposed in a different horizontal plane than said first named compartment.

9. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical walls and a horizontal wall of a sharp freezing compartment, a portion of each of the walls of said sheet including a portion of said refrigerant duct continuing from a wall of said sharp freezing compartment and also being bent to provide a plurality of walls of a second sharp freezing compartment, said second named sharp freezing compartment being disposed adjacent to and in vertical alignment with said first named compartment.

10. A cooling unit for a mechanical refrigerating apparatus including a single sheet of thin gauge metal folded upon itself to provide a double wall, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical walls and a horizontal wall of a sharp freezing compartment, a portion of each of the walls of said sheet including a portion of said refrigerant duct continuing from a wall of said sharp freezing compartment and being bent horizontally into said sharp freezing compartment from one side thereof to divide said compartment into a plurality of superimposed sharp freezing compartments.

11. A cooling unit for a mechanical refrigerating apparatus including a double walled sheet of thin gauge metal, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical side walls and a top wall of a sharp freezing compartment, a portion of each of the walls of said sheet including a portion of said refrigerant duct continuing from a wall of said sharp freezing compartment and being bent horizontally into said sharp freezing compartment from one side thereof to divide said compartment into a plurality of superimposed sharp freezing compartments.

12. A cooling unit for a mechanical refrigerating apparatus including a double walled sheet of thin gauge metal, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical side walls and a bottom wall of a sharp freezing compartment, a portion of each of the walls of said sheet including a portion of said refrigerant duct continuing from a wall of said sharp freezing compartment and being bent horizontally into said sharp freezing compartment from one side thereof to divide said compartment into a plurality of superimposed sharp freezing compartments.

13. A cooling unit for a mechanical refrigerating apparatus including a double walled sheet of thin gauge metal, said double walled sheet being sealed around its edges and having portions of one wall thereof spaced from the other wall thereof to provide a wall of a refrigerant conveying duct, the other wall of said double walled sheet extending in continuous relation with said first named wall thereof to provide the opposite wall of said refrigerant conveying duct, a portion of each of the walls of said sheet including a portion of said refrigerant duct being bent to provide the vertical side walls, a top wall and a bottom wall of a sharp freezing compartment, a portion of each of the walls of said sheet including a portion of said refrigerant duct continuing from a wall of said sharp freezing compartment and being bent horizontally into said sharp freezing compartment from one side thereof to divide said compartment into a plurality of superimposed sharp freezing compartments.

14. An evaporator including a double walled structure rolled continuously in one direction to form the top, bottom and both side walls of a plurality of separate sharp freezing compartments, the double walled structure comprising superimposed substantially continuously extending sheet-like portions spaced apart at certain points and secured together at certain other points to form a refrigerant expansion passage therebetween.

15. An evaporator including a double walled structure rolled continuously in one direction to form the top, bottom and both side walls of a plurality of separate sharp freezing compartments, the double walled structure comprising a corrugated sheet-like portion superimposed upon and secured to another sheet-like portion at contiguous points between the corrugations to form a refrigerant passage therebetween.

16. A unit through which a heat transfer medium moves comprising a sheet of metal doubled on itself forming spaced parallel wall sections, means sealing the adjacent free marginal edges of the two wall sections of the sheet, said doubled sealed sheet being bent normal to the bent margin to form two storage spaces, and refrigerant inlet and outlet means associated with the sheet.

17. A unit through which a heat transfer medium moves comprising a sheet of metal doubled on itself forming spaced parallel wall sections, means sealing the adjacent free edges of the two wall sections of the doubled sheet to form an interior chamber, said doubled sheet being bent normal to the bent marginal edge to form a plurality of aligned storage spaces, and refrigerant inlet and outlet means associated with the sheet and communicating with the chamber.

18. An evaporator including a double walled structure bent or rolled continuously in one direction to form a plurality of walls of a sharp freezing compartment, said structure being further bent or rolled in said one direction to also form a plurality of walls of a second separate sharp freezing compartment, the double walled structure comprising superimposed continuously and substantially parallelly extending sheet-like metal portions spaced apart at certain points and secured together at certain other points to form a refrigerant passage therebetween.

19. An evaporator including a double walled structure bent or rolled in one direction to form two substantially horizontal and the two substantially vertical side walls of a sharp freezing compartment, said structure including a portion extending away from a wall of said sharp freezing compartment and forming a side wall of a second sharp freezing compartment disposed in substantially the same vertical plane as said first named compartment whereby one of the horizontal walls of said first named compartment forms a horizontal wall of said second named compartment, the double walled structure comprising superimposed continuously and substantially parallelly extending sheet-like metal portions spaced apart at certain points and secured together at certain other points to form a refrigerant passage therebetween, means for supplying a refrigerating medium to said passage along the said wall intermediate the freezing compartments, and said passage being arranged to conduct said refrigerating medium from said intermediate wall to other of the walls of said compartments.

20. An evaporator including a double walled structure bent or rolled in one direction to form the top, bottom and both side walls of a sharp freezing compartment, said structure including a portion extending away from a wall of said sharp freezing compartment and forming a side wall of a second sharp freezing compartment superimposed upon said first named sharp freezing compartment whereby the top wall of said first named compartment forms the bottom wall of said second named compartment, the double walled structure comprising superimposed continuously and substantially parallelly extending sheet-like metal portions spaced apart at certain points and secured together at certain other points to form a refrigerant passage therebetween, means for supplying a refrigerating medium to said passage along the said wall intermediate the superimposed freezing compartments, and said passage being arranged to conduct said refrigerating medium from said intermediate wall to other of the walls of said compartments.

ELMER O. STOUT.